United States Patent
Kwak et al.

(10) Patent No.: US 10,528,420 B2
(45) Date of Patent: Jan. 7, 2020

(54) FLASH MEMORY SYSTEM HAVING ABNORMAL WORDLINE DETECTOR AND ABNORMAL WORDLINE DETECTION METHOD

(71) Applicant: SAMSUNG ELECTRONICS CO., LTD., Suwon-si, Gyeonggi-Go (KR)

(72) Inventors: Donghun Kwak, Hwaseong-si (KR); Sang-Soo Park, Hwaseong-si (KR); Jaewoo Im, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 963 days.

(21) Appl. No.: 13/935,604

(22) Filed: Jul. 5, 2013

(65) Prior Publication Data

US 2014/0068384 A1 Mar. 6, 2014

(30) Foreign Application Priority Data

Sep. 4, 2012 (KR) .......................... 10-2012-0097825

(51) Int. Cl.
*G06F 11/10* (2006.01)

(52) U.S. Cl.
CPC .................. *G06F 11/1068* (2013.01)

(58) Field of Classification Search
CPC ............ G06F 11/1068; G06F 11/1072; G06F 11/1008; G06F 11/1076; H04J 1/02; G11B 20/1809; H03M 13/15; H03M 13/29; H03M 13/27; H04L 1/0071; G11C 29/00
USPC ......................................................... 714/773
See application file for complete search history.

(56) References Cited

U.S. PATENT DOCUMENTS

| 5,353,256 | A | * | 10/1994 | Fandrich ............. G06F 12/1425 365/185.11 |
| 7,304,893 | B1 | | 12/2007 | Hemink |
| 7,355,892 | B2 | | 4/2008 | Hemink |
| 7,529,989 | B2 | | 5/2009 | Fujisaki |
| 7,669,004 | B2 | | 2/2010 | Lin et al. |
| 8,386,885 | B1 | * | 2/2013 | Khan ....................... G11C 7/20 714/763 |
| 9,502,129 | B1 | * | 11/2016 | Suzuki ............... G11C 16/3431 |
| 9,691,485 | B1 | * | 6/2017 | Kumar ................. G11C 16/105 |

(Continued)

FOREIGN PATENT DOCUMENTS

| CN | 101189683 A | 5/2008 |
| CN | 101310342 A | 11/2008 |

(Continued)

*Primary Examiner* — Samir W Rizk
*Assistant Examiner* — Enam Ahmed
(74) *Attorney, Agent, or Firm* — Volentine, Whitt & Francos, PLLC

(57) ABSTRACT

A flash memory controller for a flash memory system includes an ECC circuit that receives first page data and second page data read from the flash memory, and respectively counts a first number of fail bits in the first page data and a second number of fail bits in the second page data, an abnormal wordline detector configured to compare the first number of fail bits and second number of fail bits to derive a fail bit change rate between the first page data and the second page data, and generate an abnormal wordline detection signal in response to the fail bit change rate, and a control unit that controls operation of the flash memory in response to the abnormal wordline detection signal.

14 Claims, 18 Drawing Sheets

(56) References Cited

U.S. PATENT DOCUMENTS

| | | | |
|---|---|---|---|
| 9,704,588 B1* | 7/2017 | Ray | G11C 16/26 |
| 2002/0057598 A1* | 5/2002 | Sakamoto | G11C 11/5628 |
| | | | 365/185.22 |
| 2006/0034137 A1* | 2/2006 | Zanardi | G11C 29/846 |
| | | | 365/200 |
| 2006/0291303 A1 | 12/2006 | Kleveland et al. | |
| 2008/0002468 A1 | 1/2008 | Hemink | |
| 2008/0052015 A1 | 2/2008 | Ozawa et al. | |
| 2008/0151618 A1 | 6/2008 | Sharon et al. | |
| 2008/0244339 A1 | 10/2008 | Kong et al. | |
| 2009/0013234 A1* | 1/2009 | Radke | G06F 11/1068 |
| | | | 714/752 |
| 2009/0238006 A1* | 9/2009 | Nobunaga | G11C 16/10 |
| | | | 365/185.19 |
| 2009/0282305 A1* | 11/2009 | Chen | G06F 11/1068 |
| | | | 714/718 |
| 2010/0011276 A1* | 1/2010 | Chen | G06F 11/1068 |
| | | | 714/764 |
| 2010/0195411 A1* | 8/2010 | Abiko | G11C 29/4401 |
| | | | 365/189.05 |
| 2011/0051514 A1 | 3/2011 | Han et al. | |
| 2011/0066900 A1* | 3/2011 | Tokiwa | G11C 13/0007 |
| | | | 714/704 |
| 2011/0103150 A1 | 5/2011 | Chan et al. | |
| 2011/0131473 A1* | 6/2011 | Mokhlesi | G11C 11/5642 |
| | | | 714/773 |
| 2011/0191655 A1* | 8/2011 | Schreck | G06F 11/1056 |
| | | | 714/773 |
| 2011/0283164 A1* | 11/2011 | Tang | G06F 11/1016 |
| | | | 714/773 |
| 2012/0069657 A1 | 3/2012 | Choi et al. | |
| 2012/0151301 A1* | 6/2012 | Izumi | G06F 11/1048 |
| | | | 714/773 |
| 2013/0010558 A1 | 1/2013 | Chang et al. | |
| 2013/0080858 A1* | 3/2013 | Lee | G11C 16/26 |
| | | | 714/773 |
| 2013/0151914 A1* | 6/2013 | Cadigan | G06F 11/1068 |
| | | | 714/723 |

FOREIGN PATENT DOCUMENTS

| | | |
|---|---|---|
| CN | 102354534 A | 2/2012 |
| JP | 200567673 A | 9/2005 |
| KR | 1020090108586 A | 10/2009 |
| KR | 1020110022414 A | 8/2011 |
| KR | 1020120030816 A | 3/2012 |
| WO | WO2008117921 A1 | 10/2008 |

* cited by examiner

FLASH MEMORY SYSTEM HAVING ABNORMAL WORDLINE DETECTOR AND ABNORMAL WORDLINE DETECTION METHOD

CROSS-REFERENCE TO RELATED APPLICATIONS

A claim of priority under 35 U.S.C. § 119 is made to Korean Patent Application No. 10-2012-0097825 filed Sep. 4, 2012, the subject matter of which is hereby incorporated by reference.

BACKGROUND

The inventive concept relates to semiconductor memory devices, and particularly to flash memory systems. Still more particularly, the inventive concept relates to flash memory systems including an abnormal wordline detector and/or capable of executing a method of abnormal wordline detection.

Semiconductor memories may be classified as volatile or nonvolatile according to their operative nature. Volatile memories lose stored data in the absence of applied power, while nonvolatile memories are able to retain stored data under similar circumstances. Volatile memories include the Dynamic Read Only Memory (DRAM), the Static RAM (SRAM), and similar memories. Nonvolatile memories include the Electrically Erasable/Programmable Read Only Memory (EEPROM) including so-called flash memory, the Phase-change RAM (PRAM), the Magnetic RAM (MRAM), the Ferroelectric RAM (FRAM), and the like.

Among the other types of nonvolatile memories, flash memory enjoys considerable commercial success and is widely used in many different applications. Flash memory is characterized by high read data access, low power consumption, and large data storage density and size. Thus, flash memory has been incorporated into many contemporary memory system (hereafter referred to as a "flash memory system").

The constituent flash memory cells of a flash memory system are programmed to store data in accordance with a set of defined threshold voltage distributions. Ideally, each flash memory cell will exhibit, upon interrogation during a read operation, a particular threshold voltage that falls within the threshold voltage distribution associated with the program data stored during a "normal" program operation (i.e., a program operation that is executed within prescribed conditions with appropriate memory cell programming outcomes). However, practical memory system operating conditions—such as a sudden power-off of the flash memory system, certain memory system noise effects, and the like may distort (that is, undesirably change) the threshold voltage of one or more flash memory cells. Such conditions may be generally referred to as "abnormal." Abnormal conditions for a flash memory system will often result in the generation of one or more data errors (or "fail bits") among flash memory cells being programmed, erased, and/or read. Fail bits require remediation and generally slow the overall operation of the flash memory system. In extreme cases, fail bits degrade the reliability of stored data.

In order to avoid data degradation and/or memory system slowness, it is desirable to detect and remedy abnormal operating condition(s) potentially effecting memory system performance as soon as possible.

SUMMARY

In one embodiment, the inventive concept provides a flash memory system including; a flash memory having a memory cell array, and a memory controller configured to control operation of the flash memory, wherein the memory controller comprises, an ECC circuit that receives first page data and second page data read from the flash memory, and respectively counts a first number of fail bits in the first page data and a second number of fail bits in the second page data, an abnormal wordline detector configured to compare the first number of fail bits and second number of fail bits to derive a fail bit change rate between the first page data and the second page data, and generate an abnormal wordline detection signal in response to the fail bit change rate, and a control unit that controls operation of the flash memory in response to the abnormal wordline detection signal.

In another embodiment, the inventive concept provides a flash memory system includes a flash memory having a memory cell array, and an off cell counter that counts a first number of off cells in first page data read from the flash memory by a read operation using a read voltage, and counts a second number of off cells in second page data read from the flash memory by the read operation. The flash memory system also includes a memory controller configured to control operation of the flash memory, wherein the memory controller includes; an abnormal wordline detector configured to compare the first number of off cells and second number of off cells to derive an off cell change rate between the first page data and the second page data, and generate an abnormal wordline detection signal in response to the off cell change rate, and a control unit that controls operation of the flash memory in response to the abnormal wordline detection signal.

In another embodiment, the inventive concept provides a method of operating a flash memory system including a flash memory having a memory cell array and a memory controller configured to control operation of the flash memory, the method comprising; using an ECC circuit in the memory controller to receive first page data and second page data read from the flash memory, and respectively count a first number of fail bits in the first page data and a second number of fail bits in the second page data, using an abnormal wordline detector in the memory controller separate from the ECC circuit to compare the first number of fail bits and second number of fail bits and derive a fail bit change rate between the first page data and the second page data, and generate an abnormal wordline detection signal in response to the fail bit change rate, wherein a control unit in the memory controller controls operation of the flash memory in response to the abnormal wordline detection signal.

BRIEF DESCRIPTION OF THE DRAWINGS

The above and other objects and features of the inventive concept, along with its making and use, may be readily understood from the following description made with reference to the accompanying drawings.

DETAILED DESCRIPTION

Figure 1:
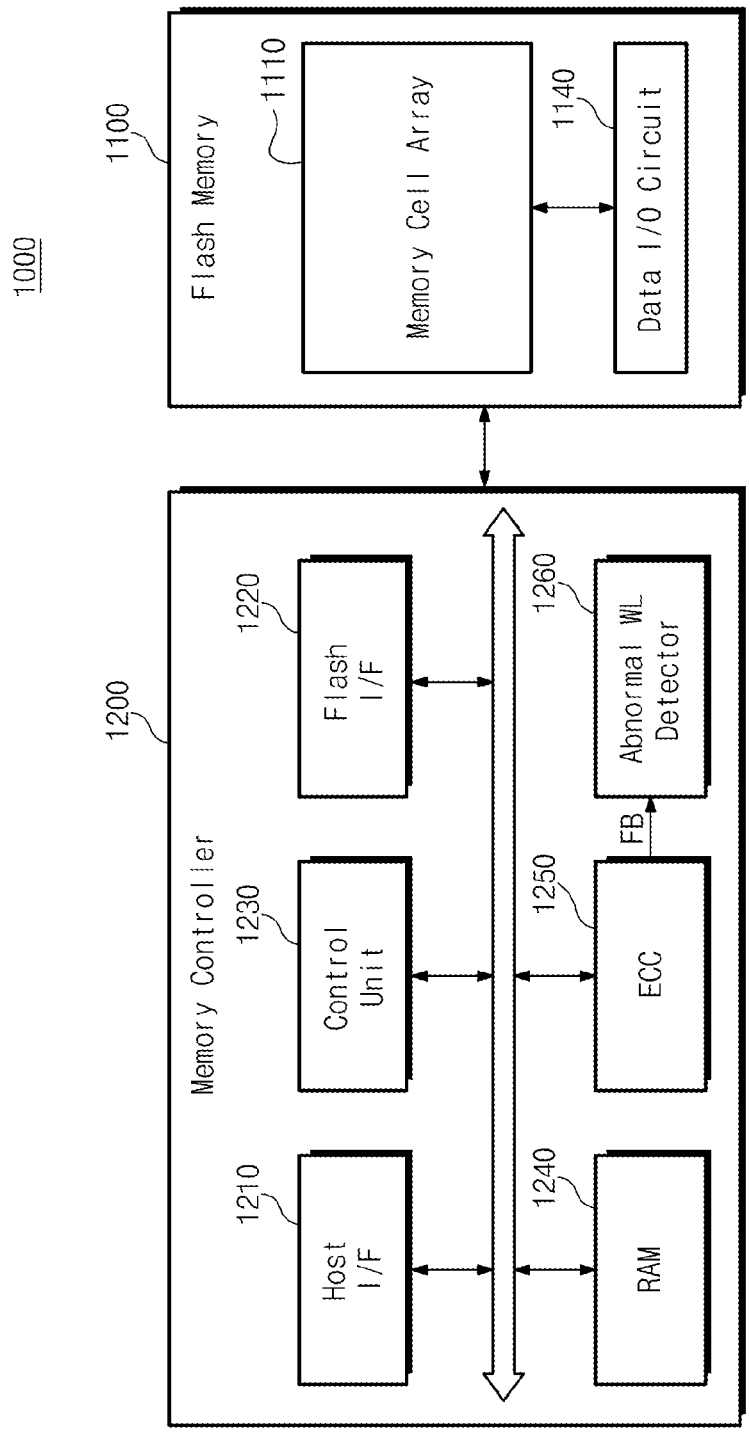
FIG. 1 is a block diagram illustrating a flash memory system according to an embodiment of the inventive concepts.

Embodiments of the inventive concept will now be described in some additional detail with reference to the accompanying drawings. The inventive concept, however, may be embodied in various different forms, and should not be construed as being limited to only the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numbers and labels denote like or similar elements throughout the attached drawings and written description. The size(s) and relative size(s) of semiconductor layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram illustrating a flash memory system according to an embodiment of the inventive concepts. Referring to FIG. 1, a flash memory system 1000 generally comprises a flash memory 1100 and a memory controller 1200. The flash memory system 1000 may include flash memory based data storage devices such as a memory card, an USB memory, a solid state drive (SSD), and the like.

The flash memory 1100 may perform an erase, write, and/or read operation under the control of the memory controller 1200. Referring to FIG. 1, the flash memory 1100 may include a memory cell array 1110 and a data input/output circuit 1140. The flash memory 1100 may perform an erase operation by the memory block and a write or read operation by the page.

The memory controller 1200 may control read and write operations on the flash memory 1100 in response to a request of a host. The memory controller 1200 may include a host interface 1210, a flash interface 1220, a control unit 1230, a RAM 1240, an ECC circuit 1250, and an abnormal wordline detector 1260.

The memory controller 1200 may transmit and receive data to and from the host via the host interface 1210. The memory controller 1200 may transmit and receive data to and from the flash memory 1100 via the flash interface 1220. The host interface 1210 may be connected with the host via a parallel ATA bus, a serial ATA bus, an SCSI, an USB, and the like.

The control unit 1230 may control an overall operation of the flash memory 1100 including reading, writing, file system managing, and so on. For example, the control unit 1230 may include a CPU, a processor, an SRAM, a DMA controller, and so on.

The RAM 1240 may operate responsive to the control of the control unit 1230, and may be used as a work memory, a buffer memory, a cache memory, and the like. When used as the work memory, data processed by the control unit 1230 may be temporarily stored at the RAM 1240. When used as the buffer memory, the RAM 1240 may be used to buffer data to be transferred from the flash memory 1100 to the host or from the host to the flash memory 1100. When used as the cache memory, the RAM 1240 may enable the low-speed flash memory 1100 to operate in high speed.

The ECC circuit 1250 may an error correction code (ECC) for correcting a fail bit or an error bit of data input from the flash memory 1100. The ECC circuit 1250 may perform error correction encoding on data to be provided to the flash memory 1100 to form data to which a parity bit is added. The parity bit may be stored at the flash memory 1100.

The ECC circuit 1250 may perform error correction decoding on data output from the flash memory 1100. That is, the ECC circuit 1250 may correct an error using the parity. The ECC circuit 1250 may correct an error using coded modulation such as LDPC (low density parity check) code, BCH code, turbo code, Reed-Solomon code, convolution code, RSC (recursive systematic code), TCM (trellis-coded modulation), BCM (Block coded modulation), and so on.

However, while correcting an error output from an abnormal wordline, the ECC circuit 1250 may not correct an error when remaining wordlines adjacent to the abnormal wordline are programmed, or when a flash memory has been in use for a long time. Thus, an abnormal wordline must be specifically detected as early as possible in order to ensure proper operation of the flash memory system. Otherwise, certain conventional error correction techniques (e.g., read error recovery operations) may effectively ignore the errant data (assuming it is correct in view of the abnormal threshold voltage distributions), or continuously re-program the same errant data to target memory cells. Herein, the term "abnormal wordline" is used to indicate a wordline connecting memory cells that consistently exhibit one or more abnormal (e.g., errant; out of specification) threshold voltage distribution(s) due to some abnormal circumstance or flash memory operating condition.

In this context, it us assumed that the ECC circuit 1250 may correct an n-bit error, wherein "n" is a natural number and thereby establish an allowable correction range. For example, when an allowable correction range for the ECC circuit 1250 is assumed to be 40 bits, the ECC circuit 1250 may correct up to a 40-bit error in data being read from the flash memory 1100. In the illustrated embodiment of FIG. 1, the control unit 1230 relies on the ECC circuit 1250 to effectively correct all errors falling within the allowable correction range, or relies on an established correction margin. Nonetheless, the control unit 1230 may be used to detect the operative presence of an abnormal wordline within the flash memory cell array. For example, the control unit 1230 may detect (or identify) a 20-bit data error being about 50% of an allowable correction range (e.g., 40 bits) assumed for the working example.

If a 20-bit error is detected in relation to a wordline, the ECC circuit 1250 may determine said wordline is be "abnormal". However, conventional method(s) of detecting an abnormal wordline via the operation of the ECC circuit 1250 may miss certain problems associated with an abnormal wordline that cannot be conventionally distinguished from a normal wordline. Alternately or additionally, in a case where a normal wordline experiences 20-bit fail due to some physical characteristic of memory cells connected to the wordline (e.g., a deterioration of said memory cells over time), the ECC circuit 1250 may erroneously determine that the "normal" wordline is abnormal. Such circumstances will be more fully described with reference to FIGS. 3 and 4.

To solve the above-described problems, the abnormal wordline detector 1260, separate from the ECC circuit 1250 of FIG. 1, is used to detect an abnormal wordline. In one approach, the abnormal wordline detector 1260 will receive fail bit information (FB) from the ECC circuit 1250, and may exactly detect an abnormal wordline using (e.g.,) a fail bit change rate for one or more page(s). This approach will be described in some additional detail with reference to FIGS. 5, 6 and 7.

Figure 2:
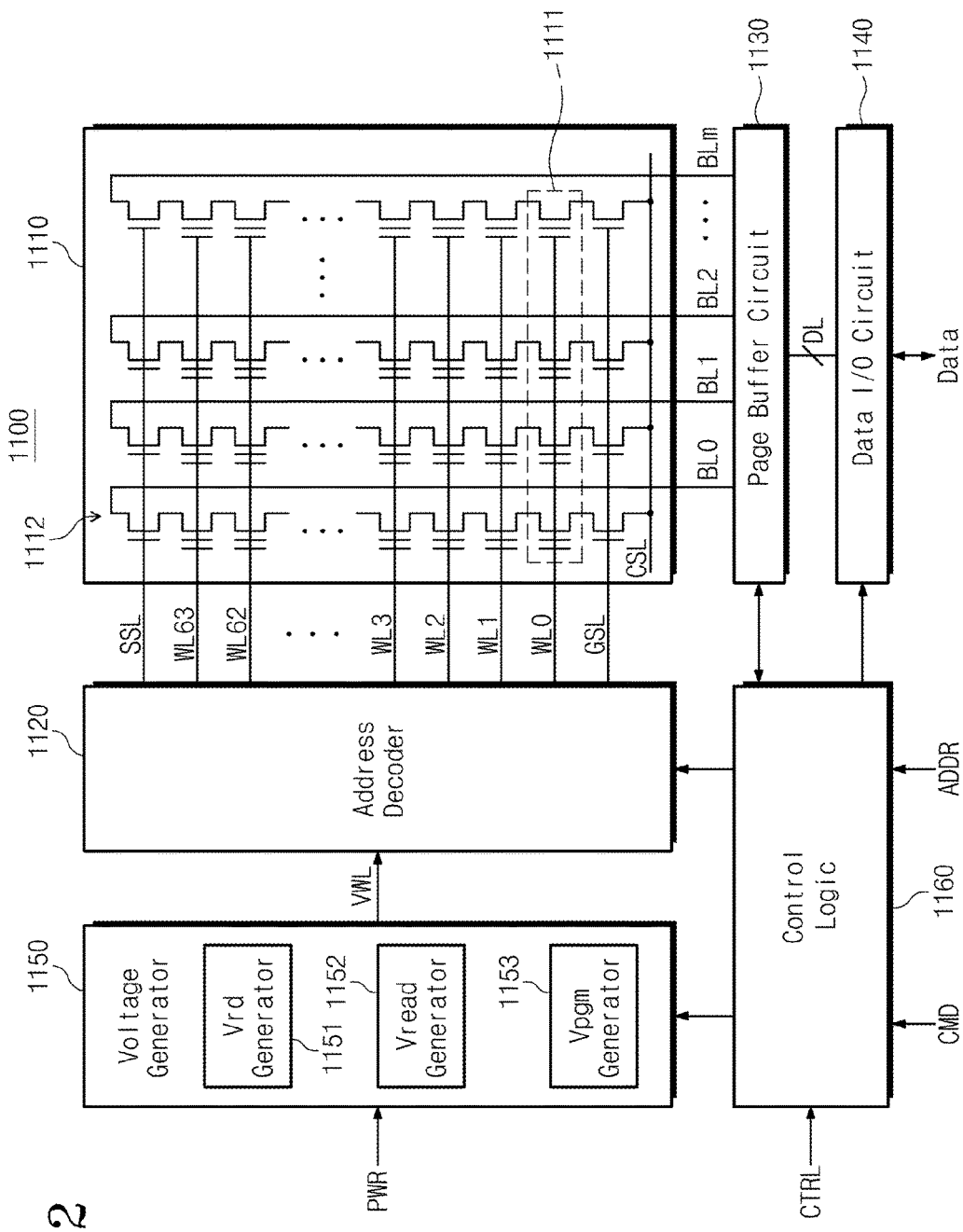
FIG. 2 is a block diagram further illustrating the flash memory of FIG. 1.

FIG. 2 is a block diagram further illustrating the flash memory 1100 of FIG. 1 according to an embodiments of the inventive concept. Referring to FIG. 2, the flash memory 1100 comprises a memory cell array 1110, an address decoder 1120, a page buffer circuit 1130, a data input/output circuit 1140, a voltage generator 1150, and control logic 1160.

The memory cell array 1110 may be formed of a plurality of memory blocks. As an example, one memory block is illustrated in FIG. 2. Each memory block may be formed of a plurality of physical pages. Herein, the physical page may mean a set of memory cells connected with a wordline. In FIG. 2, a reference numeral "1111" may indicate a physical page. Each physical page may be formed of a plurality of memory cells. Each memory cell may be formed of a cell transistor having a control gate and a floating gate.

The memory cell array 1110 may include a plurality of cell strings 1112. Each cell string 1112 may include a string selection transistor connected with a string selection line SSL, a plurality of memory cells each connected with a plurality of wordlines WL0 to WL63, and a ground selection transistor connected with a ground selection line GSL. In each cell string 1112, the string selection transistor may be connected with a corresponding bit line, and the ground selection transistor may be connected with a common source line CSL.

In the flash memory 1100, one memory cell may store a single bit of data or two or more bits of data (hereinafter, referred to as multi-bit data). An SLC flash memory storing 1-bit data per memory cell may have one of an erase state and a program state according to a threshold voltage distribution. An MLC flash memory storing multi-bit data per memory cell may have one of an erase state and plural program states according to a threshold voltage distribution.

The address decoder 1120 may be connected to the memory cell array 1110 via the selection lines SSL and GSL and the wordlines WL0 to WL63. At a program or read operation, the address decoder 1120 may select a wordline (e.g., WL0) in response to an address (ADDR).

The page buffer circuit 1130 may be connected to the memory cell array 1110 via bit lines BL0 to BLm. The page buffer circuit 1130 may include a plurality of page buffers (not shown). A page buffer may be connected to a bit line, which is referred to as the all bit line structure. Two or more page buffers may be connected to a bit line, which is referred to as the shield bit line structure. The page buffer circuit 1130 may temporarily store data to be programmed or data read out from the selected page 1111.

The data input/output circuit 1140 may be connected to the page buffer circuit 1130 via data lines DL. Further, the data input/output circuit 1140 may be connected to a memory controller 1200 (refer to FIG. 1) via input/output lines. The data input/output circuit 1140 may receive program data from the memory controller 1200 at programming and provide read data to the memory controller 1200 at reading.

The voltage generator 1150 may receive a power (PWR) from the memory controller 1200 to generate a wordline voltage (VWL) needed to read or write data. The wordline voltage may be provided to the address decoder 1120. As illustrated in FIG. 2, the voltage generator 1150 may include a selection read voltage (Vrd) generator 1151, a non-selection read voltage (Vread) generator 1152, and a program voltage (Vpgm) generator 1151.

The selection read voltage generator 1151 may generate a selection read voltage to be transferred to a selected wordline (e.g., WL0). The non-selection read voltage generator 1152 may generate a non-selection read voltage to be transferred to unselected wordlines (e.g., WL1 to WL63). The non-selection read voltage may have a voltage level sufficient to turn on a memory cell connected with a cell string. The program voltage generator 1153 may generate a program voltage to be transferred to the selected wordline WL0 at a program operation.

The control logic 1160 may control programming, reading, and erasing of the flash memory 1100 using a command (CMD), an address (ADDR), and a control signal (CTRL). For example, at reading, the control logic 1160 may control the address decoder 1120 to provide the selection read voltage to the selected wordline WL0 and the page buffer circuit 1130 and the data input/output circuit 1140 to read data programmed at a selected page 1111.

Figure 3:
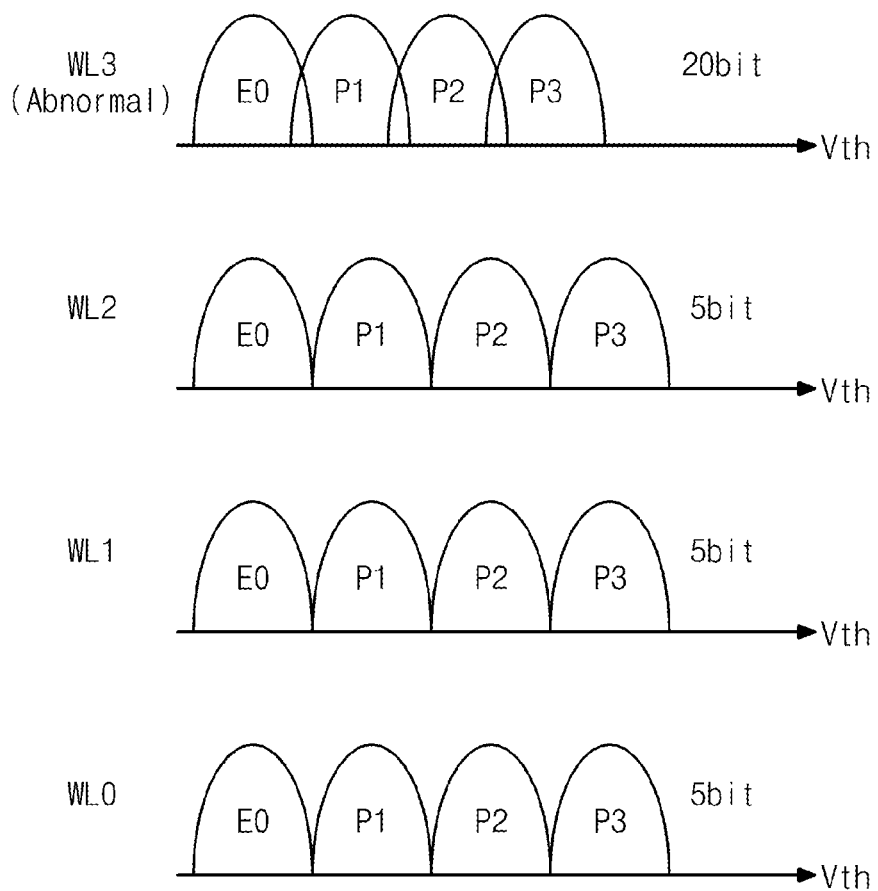
FIGS. 3 and 4 are respective conceptual diagrams illustrating certain threshold voltage distributions for memory cell associated with various wordlines of the flash memory device of FIG. 2.

In the assumed context of the flash memory 1100 of FIG. 2, FIG. 3 is a conceptual diagram illustrating threshold voltage distributions for flash memory cells of the memory cell array 1110. For this description, it is assumed that each flash memory cell stores 2-bit data. Thus, each 2-bit flash memory cell should "normally" exhibit a threshold voltage that falls within one of four possible data states respectively associated with an erase state E0, a first program state P1, a second program state P2, and a third program state P3. Note that the respective threshold voltage distribution have sequentially higher ranges from the erase state E0 to the third program state P3.

As is conventionally understood, the flash memory device 1100 may a group of program flash memory cells connected to a wordline at the same time. One particular form of this programming operation type is called "page programming" (via d "page program operation) since a defined "page" of flash memory cells—all connect to the same wordline—are programmed together. Thus, assuming as the working example does the use of 2-bit flash memory cells, each page program operation will be twice (2×) performed with respect to the wordline. That is, a first page program operation (e.g., a Least Significant Bit (LSB) page program operation), and a second page program (e.g., a Most Significant Bit (MSB) page program operation) are sequentially performed.

Adjacent threshold voltage distributions are separated by a specified read margin. For example, respective read margins should ideally exist between E0 and P1, P1 and P2, and P2 and P3. However, under the stress of practical working conditions read margins may shrink or disappear to (e.g.,) due to degradation in certain physical characteristic(s) of the flash memory cells, signal line noise effects, sudden power-off transients, etc. Reduced or nonexistent read margins lead to the generation of fail bits.

Referring to FIG. 3, it is assumed that each of wordlines WL0 to WL3 provides read data having on average about 5 fail bits. Such circumstances are assumed to be normal, since they fall within operating expectations and/or specifications for the flash memory system 1000. However, at some point in time it is assumed that an abnormal operating condition arises in relation to wordline WL3 due to a sudden power-off. For example, during a data access operation directed to flash memory cells connected to wordline WL3, the power applied to the flash memory 1100 is suddenly interrupted. As a result, the threshold voltage distributions exhibited by memory cells connected to the wordline WL3 are changed outside of specification as illustrated in FIG. 3. Here, it is assumed that the threshold voltage distributions are collapsed to significantly overlap. This set of altered threshold voltage distribution relationships leads to the presence of 20 fail bits, for example. In such a case where one wordline is clearly operating differently from other adjacent or proximate wordlines, the ECC circuit 1250 of FIG. 1 may be used to effectively determine that wordline WL3 is an abnormal wordline.

Figure 4:
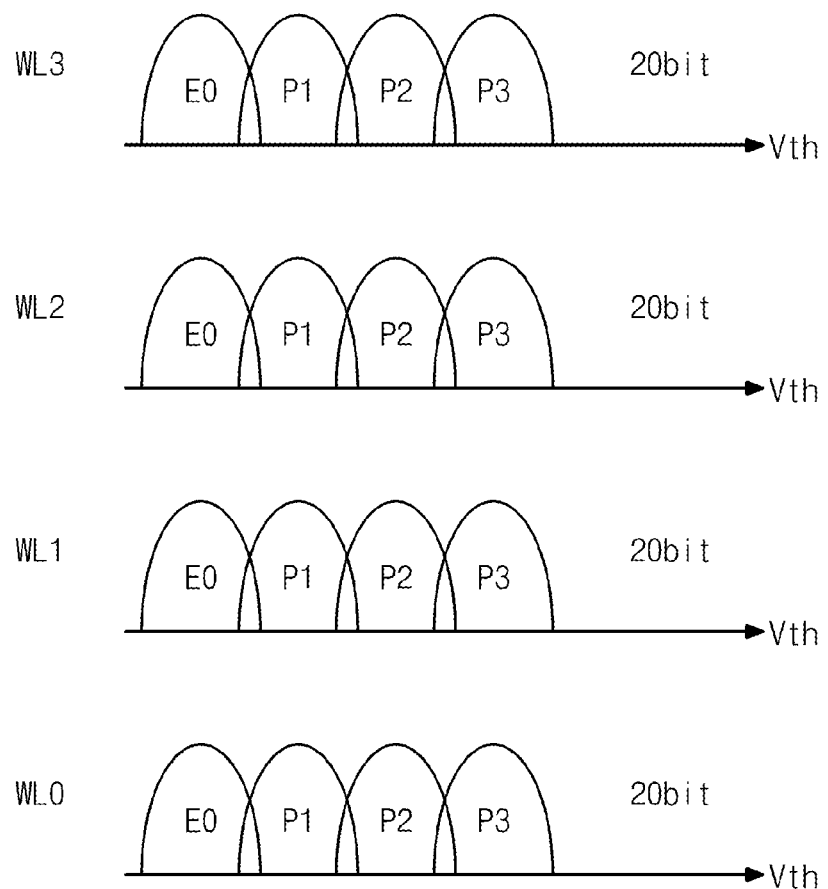

FIG. 4 is another conceptual diagram illustrating another case for the memory system 1000 of FIGS. 1 and 2 in which all four wordlines WL0, WL1, WL2, and WL3 provide read data having (e.g.,) 20 fail bits on average. This type of outcome is possible where the flash memory cells connected to the four wordlines are similarly fatigued (i.e., worn out from long use). And the number of fail bits detected in read data coming from each of the four wordlines will be about the same, this general level of fail bits should not result in a determination of abnormal wordline operation.

Yet, under the conditions described in relation to the example of FIG. 4, conventional abnormal wordline determination techniques implemented by an ECC circuit may nonetheless erroneously determine that one or more of WL0, WL1, WL2 and WL3 are abnormal wordline(s). In order words, the condition (e.g., flash memory cell fatigue) causing the excessive fail bits of FIG. 4 may be misinterpreted as an abnormal wordline condition(s).

Embodiments of the inventive concept successfully address this type of problem among others, and may be used to readily and more accurately determine the presence of an abnormal wordline. Further, embodiments of the inventive concept may determine an abnormal wordline much earlier than analogous, conventional memory systems and methods. Certain embodiments of the inventive concept including an abnormal wordline detector may be used to distinguish an abnormal wordline from normal wordline(s) using respective fail bit change rates for respective wordline-related groupings of flash memory cells (e.g., for respective pages of flash memory cells).

Figure 5:
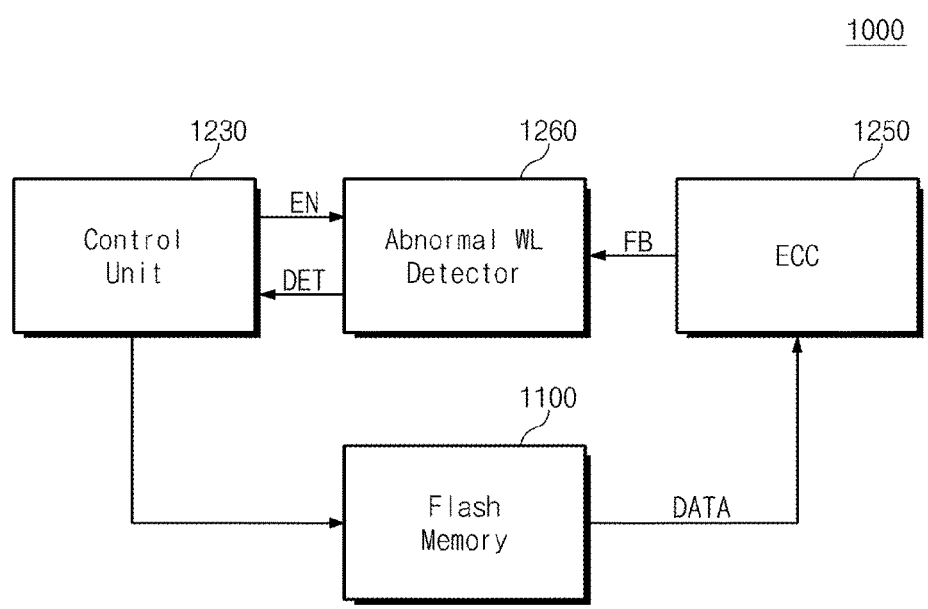
FIG. 5 is a block diagram illustrating an abnormal wordline detection method for the flash memory system of FIG. 1 according to an embodiment of the inventive concept.

FIG. 5 is a block diagram further illustrating the operation of the flash memory system of FIG. 1 including the abnormal wordline detector 1260 according to an embodiment of the inventive concept. Referring to FIG. 5, the flash memory system 1000 again comprises the flash memory 1100, control unit 1230, ECC circuit 1250, and abnormal wordline detector 1260.

The ECC circuit 1250 may be used to generate so-called "fail bit information" (FB) for each page of data (DATA) retrieved from the flash memory 1100. And the fail bit information may be provided to the abnormal wordline detector 1260.

It is assumed that the abnormal wordline detector 1260 operates in response to an enable signal (EN) received from the control unit 1230. The abnormal wordline detector 1260 may be used to detect an abnormal wordline in the flash memory 1100 using the fail bit information. Herein, the fail bit information is assumed to indicate a number of fail bits that exist in each page of data. Thus, in this example, it is assumed that the flash memory 1100 executes a read operation on a page-by-page basis, hence the fail bit information is provided on a page basis. Of course, other wordline-related groupings of flash memory cells might be used with corresponding fail bit information, but many flash memory systems specify a data page.

In certain embodiments of the inventive concept, the abnormal wordline detector 1260 may store the page-wise fail bit information. For example, the abnormal wordline detector 1260 may store "FBi" fail bit information for a corresponding "ith page", and "FBj" fail bit information for a corresponding "jth page", etc. During certain methods of detecting an abnormal wordline, the respective stored fail bit information FBi and FBj may be compared in order to generate an abnormal wordline detection signal (DET).

The control unit 1230 may control the flash memory 1100 in response to the abnormal wordline detection signal from the abnormal wordline detector 1260. For example, the control unit 1230 may respond to the abnormal wordline detection signal by performing a restoration operation (e.g., a particular re-programming operation) on the implicated memory cells of the abnormal wordline.

Figure 6:
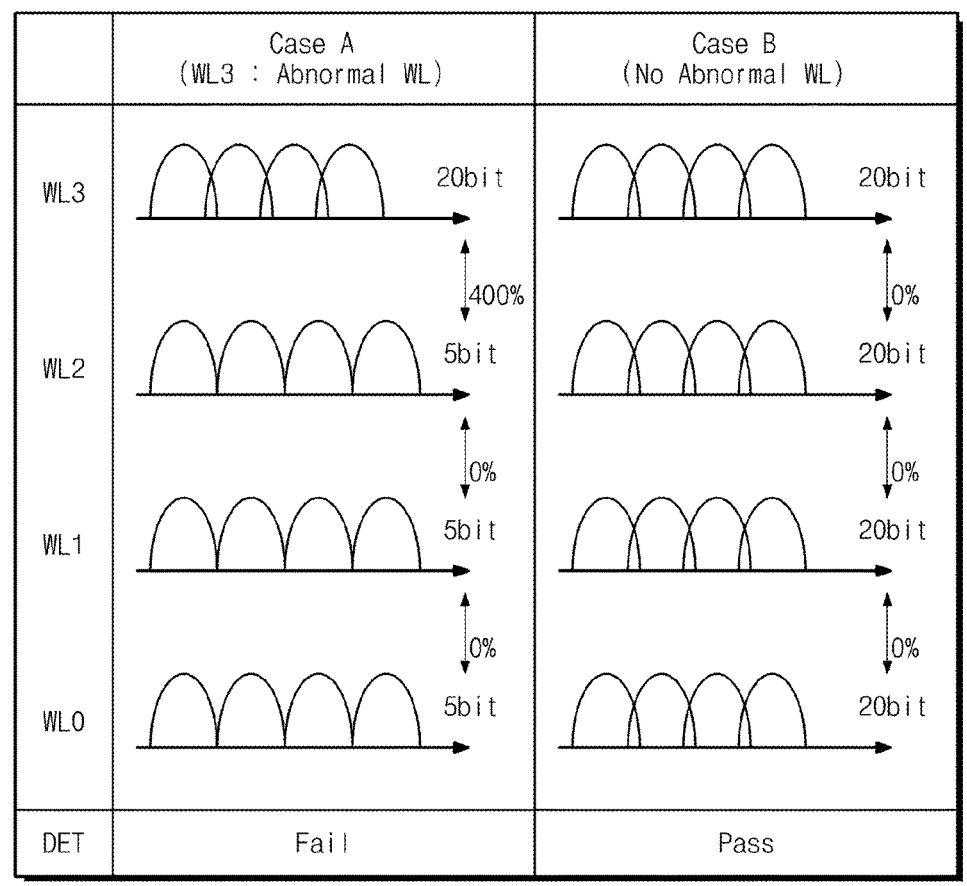
FIG. 6 is a conceptual diagram illustrating a flash memory operating method in which an abnormal wordline is detected using a comparison between fail bits of pages for the flash memory system of FIG. 5.

FIG. 6 is a diagram illustrating a method in which an abnormal wordline is detected by comparing the number of fail bits of pages in a flash memory system consistent with the description of FIG. 5. In FIG. 6, a case "A" is one in which an abnormal circumstance is generated for wordline WL3 (of FIG. 3), and a case "B" in which each one of four wordlines WL0, WL1, WL2 and WL3 provides page data including 20-bit fail on average due to a general degradation in the physical characteristic(s) of constituent memory cells.

Referring to case A, since 5-bit fail is generated at wordlines WL0 and WL1, respectively, a fail bit change rate between the wordlines WL0 and WL1 is 0%. Likewise, a fail bit change rate between wordlines WL1 and WL2 is 0%. However, since 5-bit fail is generated at the wordline WL2 and 20-bit fail is generated at a wordline WL3, a fail bit change rate between the wordlines WL2 and WL3 is 400%. Under these conditions, the abnormal wordline detector 1260 determines that wordline WL3 is an abnormal wordline based on fail bit information associated with adjacent or proximate wordline(s).

Referring to the case B, since an average 20-bit fail is generated at each wordline WL0, WL1, WL2 and WL3 due to the general degradation of the physical characteristic(s) of flash memory cells, corresponding fail bit change rates between each pair of adjacent wordlines is 0%. Thus, the abnormal wordline detector 1260 will not determine that any one of the considered wordlines is an abnormal wordline. However, in certain embodiments of the inventive concept, the abnormal wordline detector 1260 may be used to generate a "fail signal" when a particular fail bit change rate exceeds a reference fail bit change rate, and to generate a "pass signal" when the fail bit change rate does not exceed the fail bit reference change rate.

Figure 7:
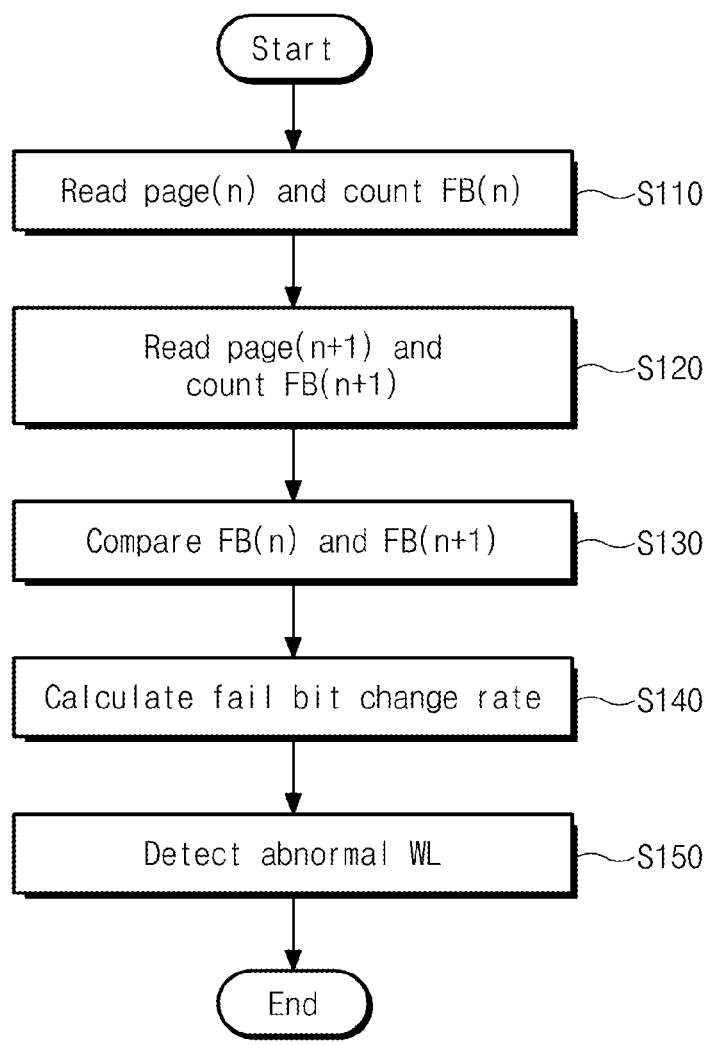
FIG. 7 is a flowchart summarizing an abnormal wordline detection method for the flash memory system of FIG. 5 according to an embodiment of the inventive concept.

FIG. 7 is a flow summarizing an abnormal wordline detection method for the flash memory system 1000 of FIGS. 1 and 2 according to an embodiment of the inventive concept.

According to this exemplary method, in operation S110, the flash memory 1100 reads an "nth" page (or page(n)) under the control of the control unit 1230. The resulting read data is provided to the ECC circuit 1250, and the ECC circuit 1250 counts a number of fail bits FB(n) for the nth page of read data.

In operation S120, the flash memory 1100 reads a next or "(n+1)th" page (or page(n+1)) under the control of the control unit 1230. The resulting read data is provided to the ECC circuit 1250, and the ECC circuit 1250 counts a number of fail bits FB(n+1) for the (n+1)th page.

In operation S130, an abnormal wordline detector 1260 may be sued to compare the values FB(n) and FB(n+1) provided from the ECC circuit 1250. The abnormal wordline detector 1260 may internally store fail bit information for each page respectively calculated in operations S110 and S120.

In operation S140, the abnormal wordline detector 1260 may be used to calculate a fail bit change rate between (e.g.,) adjacent pages of read data (i.e., read data retrieved from adjacently located wordlines). Alternately, the abnormal wordline detector 1260 may be used to calculate a fail bit change rate between (e.g.,) proximate pages of read data (i.e., read data retrieved from proximally located wordlines).

In operation S150, the abnormal wordline detector 1260 may detect an abnormal wordline based on a fail bit change rate calculated in operation S140. As described above, a fail bit change rate between an abnormal wordline and a normal wordline may be larger than that between normal wordlines. The abnormal wordline detector 1260 may provide a detection signal DET to the control unit 1230. A fail signal may be provided to the control unit 1230 when an abnormal wordline is detected, and a pass signal may be provided to the control unit 1230 when no abnormal wordline is detected.

As described above, the flash memory system 1000 of FIG. 1 may detect an abnormal wordline at a relatively early stage. Further, it is possible to distinguish normal and abnormal wordlines using fail bit change rates of pages calculated via an abnormal wordline detector 1260. The reason may be that in case of normal wordlines, there is almost no difference between fail bit occurrence frequencies due to a variation in a physical characteristic of memory cells.

Figure 8:
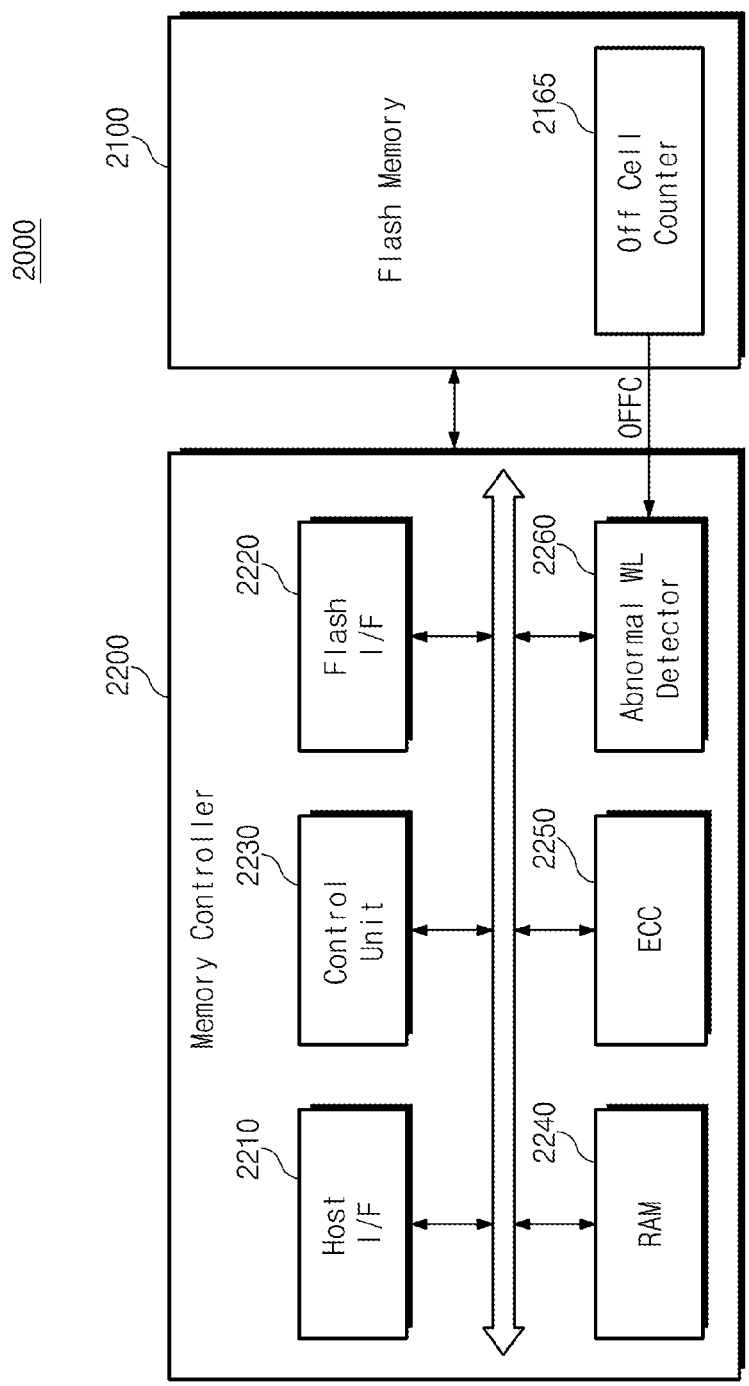
FIG. 8 is a block diagram illustrating a flash memory system according to another embodiment of the inventive concept.

FIG. 8 is a block diagram illustrating a flash memory system according to another embodiment of the inventive concept. Referring to FIG. 8, a flash memory system 2000 generally comprises a flash memory 2100 and a memory controller 2200.

A threshold voltage distribution of memory cells may be distinguished from an initial threshold voltage distribution due to an abnormal circumstance such as sudden power-off or a variation in a physical characteristic such as deterioration of memory cells caused by long use. If a gap between threshold voltage distributions becomes narrower, fail bits will be generated during a read operation. Certain embodiments of the inventive concept may compare change rates for the number of off cells in adjacent or proximate pages to detect an abnormal wordline relatively early. Also, embodiments of the inventive concept may faithfully distinguish a normal wordline from an abnormal wordline.

The flash memory 2100 may modified to include an "off cell counter" 2165. The off cell counter 2165 is a circuit that counts a number of memory cells being programmed to a specific data value (e.g., 0 and 1 for a binary flash memory cell) during a read operation where a specific read voltage is applied to a selected wordline. Herein, any selected data value may be used to identify "off cells" in a flash memory cell array.

The memory controller 2200 includes a host interface 2210, a flash interface 2220, a control unit 2230, a RAM 2240, an ECC circuit 2250, and an abnormal wordline detector 2260. The abnormal wordline detector 2260 receives off cell information (OFFC) from the off cell counter 2165, and may exactly detect an abnormal wordline in relation to a derived off cell change rate of each page. This will be more fully described with reference to FIGS. 10 and 11.

Figure 9:
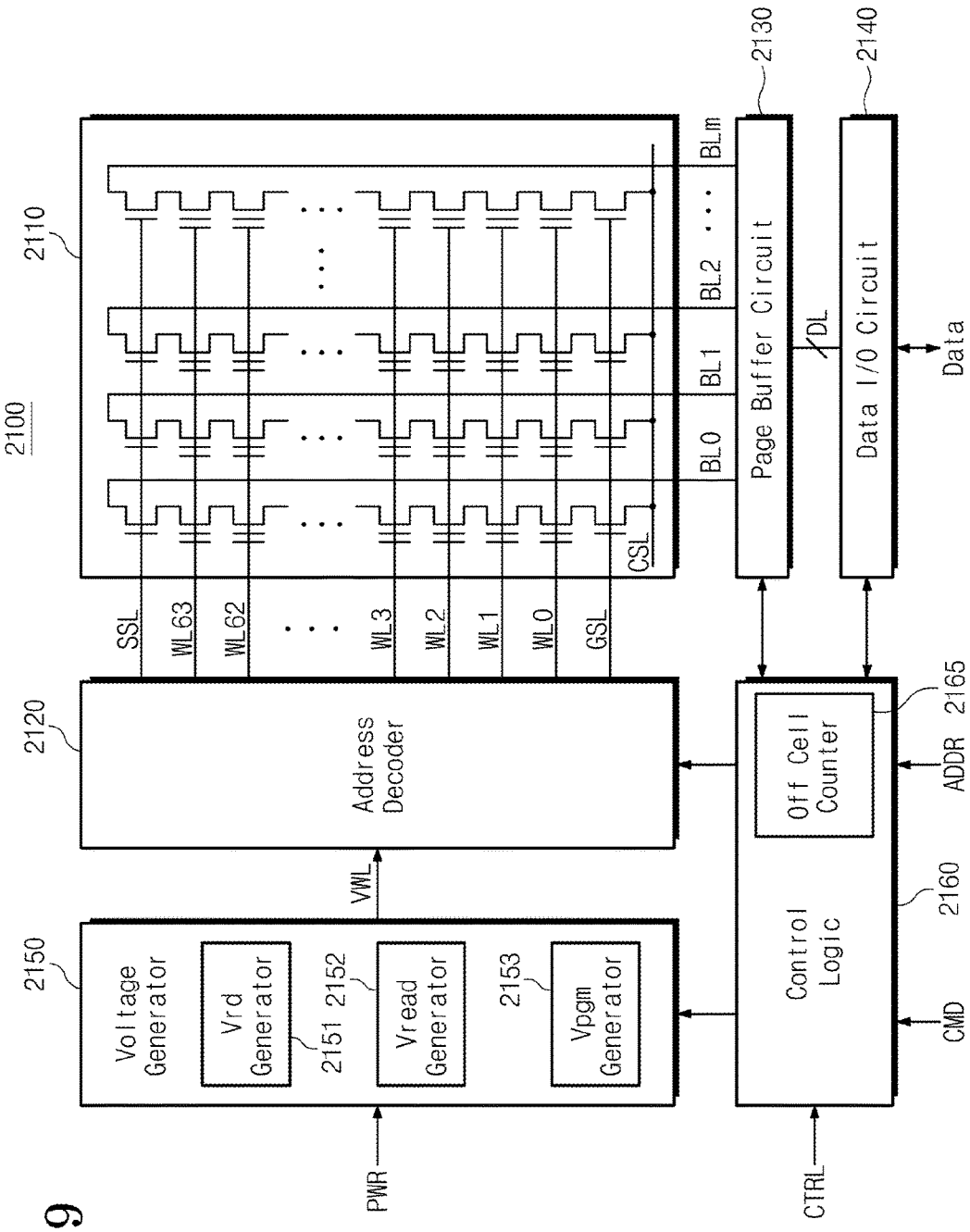
FIG. 9 is a block diagram further illustrating the flash memory device 2100 of FIG. 8.

FIG. 9 is a block diagram further illustrating the flash memory 2100 of FIG. 8. Referring to FIG. 9, the flash memory 2100 comprises a memory cell array 2110, an address decoder 2120, a page buffer circuit 2130, a data input/output circuit 2140, a voltage generator 2150, and control logic 2160.

The voltage generator 2150 may include a selection read voltage generator 2151, a non-selection read voltage generator 2152, and a program voltage generator 2153. The control logic 2160 may control programming, reading and erasing of the flash memory 2100 using a command (CMD), an address (ADDR), and a control signal (CTRL).

Referring to FIG. 9, the control logic 2160 may include the off cell counter 2165. The off cell counter 2165 may be used to count a number of off cells among the memory cells connected with each wordline. That is, during a read operation performed using a specific read voltage (Vrd) applied to a wordline, the off cell counter 2165 counts a number of memory cells having a specific data value (e.g., 0).

The off cell counter 2165 then provides the off cell information to an abnormal wordline detector 2260. The abnormal wordline detector 2260 may detect an abnormal wordline in relation to an off cell change rate for each page of read data. The abnormal wordline detector 2260 may generate a fail signal when an off cell change rate exceeds a reference change rate, or a pass signal when the off cell change rate does not exceed the reference change rate.

The flash memory system 2000 of FIG. 8 may early detect an abnormal wordline. Also, the inventive concept may easily distinguish a normal wordline and an abnormal wordline using off cell change rates of pages calculated by the abnormal wordline detector 2260.

Figure 10:
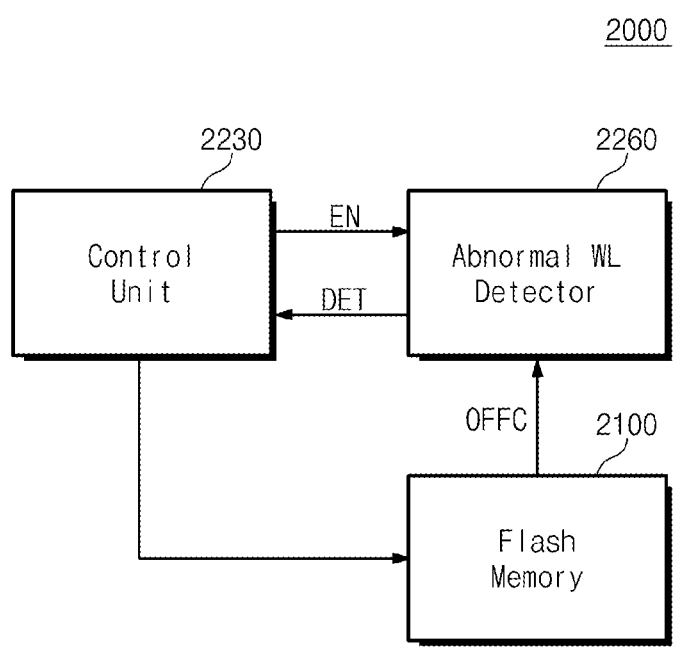
FIG. 10 is a conceptual diagram illustrating an abnormal wordline detection method for the flash memory system of FIG. 8.

FIG. 10 is a block diagram illustrating an abnormal wordline detection method for the flash memory system 2000 of FIG. 8. Referring to FIG. 10, the flash memory system 2000 again includes the flash memory 2100, control unit 2230, and abnormal wordline detector 2260.

The abnormal wordline detector 2260 is assumed to operate in response to an enable signal (EN) received from the control unit 2230. The abnormal wordline detector 2260 receives off cell information from the flash memory 2100.

Herein, the off cell information may be derived from read data obtained during a read operation using a specific read voltage (Vrd) applied to a selected wordline or the number of off cells. Since the flash memory 2100 is assumed to perform read operations on a page basis, the off cell information is provided on a page basis.

The abnormal wordline detector 2260 may store off cell information for each page of the flash memory 2100. For example, the abnormal wordline detector 2260 may store off cell information OFFCi on an ith page and off cell information OFFCj on a jth page, compare the off cell information OFFCi and OFFCj, and generate an abnormal wordline detection signal DET as a comparison result.

Figure 11:
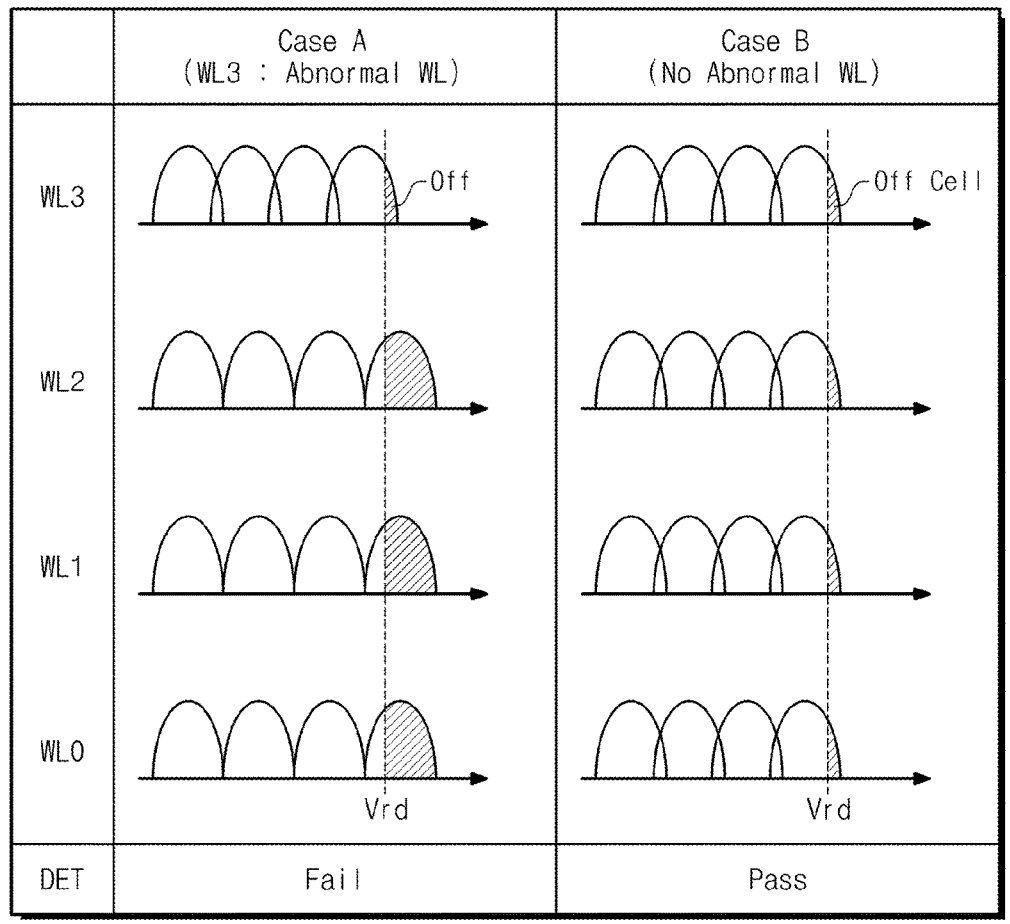
FIG. 11 is a conceptual diagram illustrating method in which an abnormal wordline is detected using a comparison between off cell numbers of pages in the flash memory system of FIG. 10.

FIG. 11 is a diagram illustrating a method in which an abnormal wordline is detected by a comparison between off cell numbers for pages in the flash memory system 2000 of FIG. 10. In FIG. 11, a case "A" is one where an abnormal circumstance is generated by wordline WL3, and a case "B" is one where threshold voltage distributions for memory cells are generally changed due memory cell fatigue.

Referring to case A, during a read operation where a specific read voltage (Vrd) is applied to the flash memory 2100, a number of off cells obtained from each wordline may be understood as being related to the shaded area of each threshold voltage distribution. That is, in the case that an abnormal circumstance is generated by wordline WL3, an off cell change rate between an abnormal wordline and a normal wordline will be larger than that between two normal wordlines.

Referring to case B, since the threshold voltage distributions for memory associated with each of wordlines WL0, WL1, WL2 and WL3 are changed due to memory cell fatigue, an off cell change rate between the various wordlines will be 0%. Under such conditions, the abnormal wordline detector 2260 will not determine an abnormal wordline based on off cell information between any two adjacent or proximate wordlines.

As described above, the flash memory system 2000 in FIG. 8 may detect an abnormal wordline at an early stage. Further, it is possible to distinguish normal and abnormal wordlines using off cell change rates of pages calculated via the abnormal wordline detector 2260.

A memory system according to an embodiment of the inventive concept may be applied or provided to various products. The memory system according to an embodiment of the inventive concept may be implemented by electronic devices such as a personal computer, a digital camera, a camcorder, a cellular phone, an MP3 player, a PMP, a PSP, a PDA, and the like as well as storage devices such as a memory card, an USB memory, a solid state drive (hereinafter, referred to as SSD), and the like.

Figure 12:
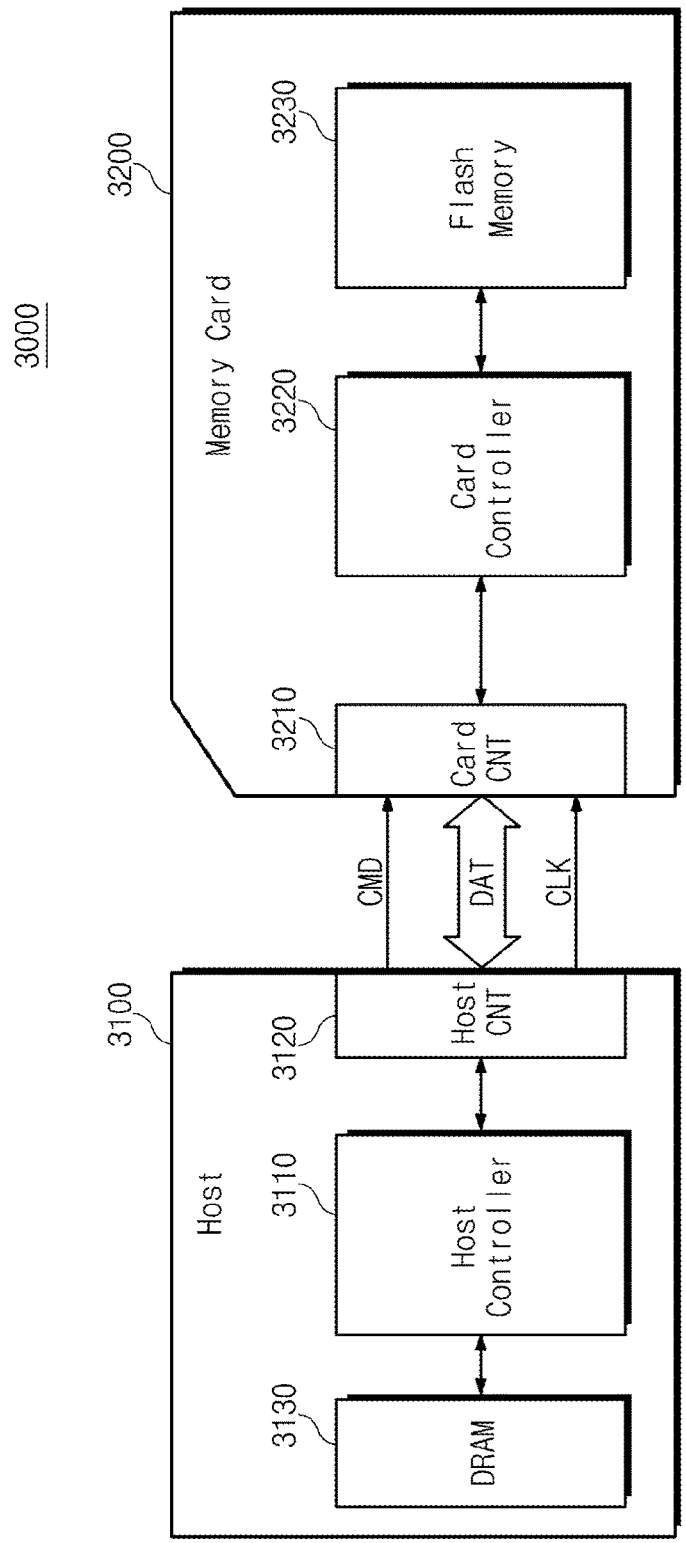
FIG. 12 is a block diagram illustrating a memory card system that may incorporate a memory system according to an embodiment of the inventive concept.

FIG. 12 is a block diagram illustrating a memory card system that may incorporate a memory system according to an embodiment of the inventive concept. A memory card system 3000 may include a host 3100 and a memory card 3200. The host 3100 may include a host controller 3110, a host connection unit 3120, and a DRAM 3130.

The host 3100 may write data at the memory card 3200 and read data from the memory card 3200. The host controller 3110 may send a command (e.g., a write command), a clock signal CLK generated from a clock generator (not shown) in the host 3100, and data to the memory card 3200 via the host connection unit 3120. The DRAM 3130 may be a main memory of the host 3100.

The memory card 3200 may include a card connection unit 3210, a card controller 3220, and a flash memory 3230. The card controller 3220 may store data at the flash memory 3230 in response to a command input via the card connection unit 3210. The data may be stored in synchronization with a clock signal generated from a clock generator (not shown) in the card controller 3220. The flash memory 3230 may store data transferred from the host 3100. For example, in a case where the host 3100 is a digital camera, the memory card 3200 may store image data.

The memory card system 3000 may include an abnormal wordline detector (Referring to FIG. 1 or 8) within the card controller 3220 or the flash memory 3230. The memory card system 3000 may detect an abnormal wordline at an early stage. Further, it is possible to distinguish normal and abnormal wordlines using fail bit change rates or off cell change rates of pages calculated via the abnormal wordline detector.

Figure 13:
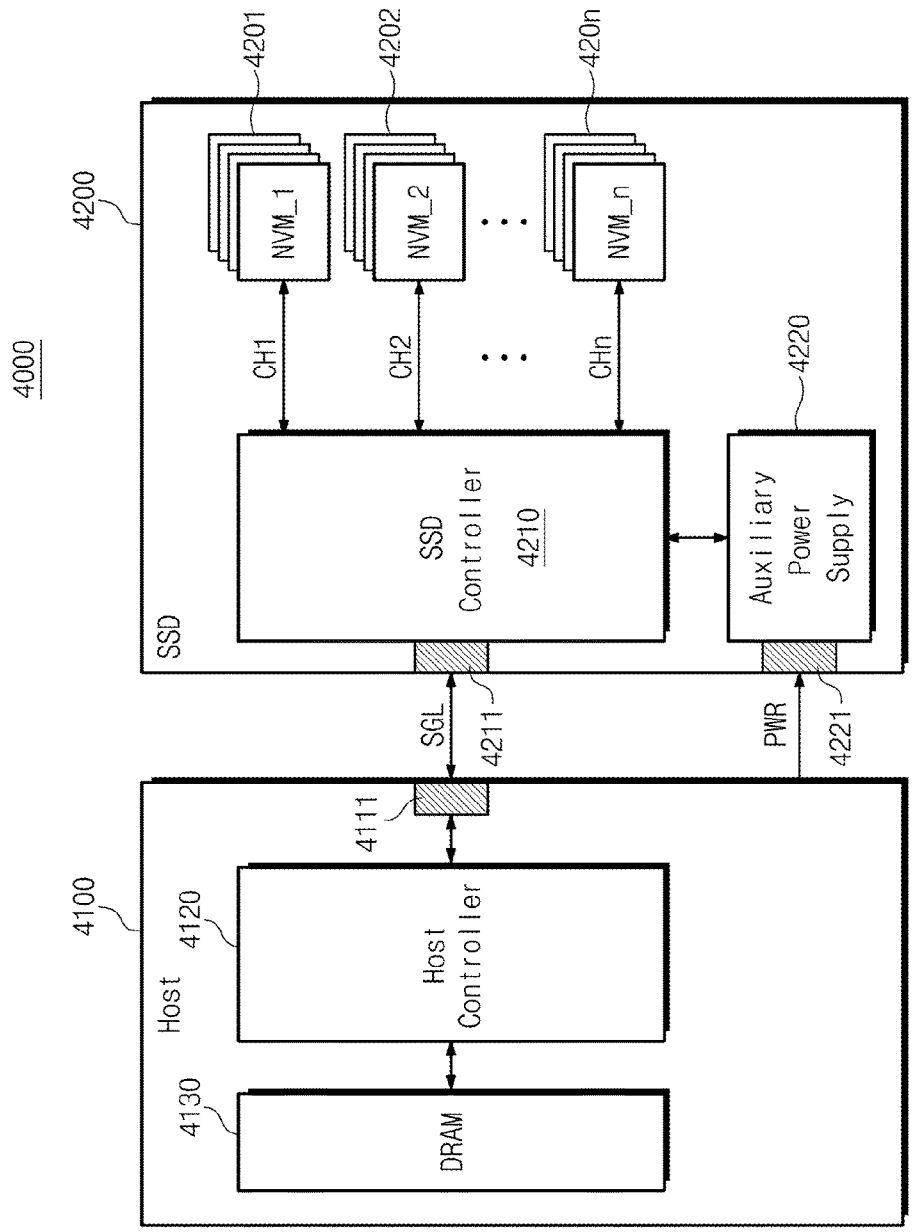
FIG. 13 is a block diagram illustrating a solid state drive (SSD) system that may incorporate a memory system according to the inventive concept is applied.

FIG. 13 is a block diagram illustrating a solid state drive system that may incorporate a memory system according to the inventive concept. Referring to FIG. 13, a solid state drive (SSD) system 4000 may include a host 4100 and an SSD 4200. The host 4100 may include a host interface 4111, a host controller 4120, and a DRAM 4130.

The host 4100 may write data in the SSD 4200 or read data from the SSD 4100. The host controller 4120 may transfer signals SGL such as a command, an address, a control signal, and the like to the SSD 4200 via the host interface 4111. The DRAM 4130 may be a main memory of the host 4100.

The SSD 4200 may exchange signals SGL with the host 4100 via the host interface 4211, and may be supplied with a power via a power connector 4221. The SSD 4200 may include a plurality of nonvolatile memories 4201 to 420n, an SSD controller 4210, and an auxiliary power supply 4220. Herein, the nonvolatile memories 4201 to 420n may be implemented by not only a NAND flash memory but also a nonvolatile memory such as PRAM, MRAM, ReRAM, or the like.

The plurality of nonvolatile memories 4201 to 420n may be used as a storage medium of the SSD 4200. The plurality of nonvolatile memories 4201 to 420n may be connected with the SSD controller 4210 via a plurality of channels CH1 to CHn. One channel may be connected with one or more nonvolatile memories. Nonvolatile memories connected with one channel may be connected with the same data bus.

The SSD controller 4210 may exchange signals SGL with the host 4100 via the host interface 4211. Herein, the signals SGL may include a command, an address, data, and the like. The SSD controller 4210 may be configured to write or read out data to or from a corresponding nonvolatile memory according to a command of the host 4100. The SSD controller 4210 will be more fully described with reference to FIG. 14.

The auxiliary power supply 4220 may be connected with the host 4100 via the power connector 4221. The auxiliary power supply 4220 may be charged by a power PWR from the host 4100. The auxiliary power supply 4220 may be placed inside or outside the SSD 4200. For example, the auxiliary power supply 4220 may be put on a main board to supply an auxiliary power to the SSD 4200.

Figure 14:
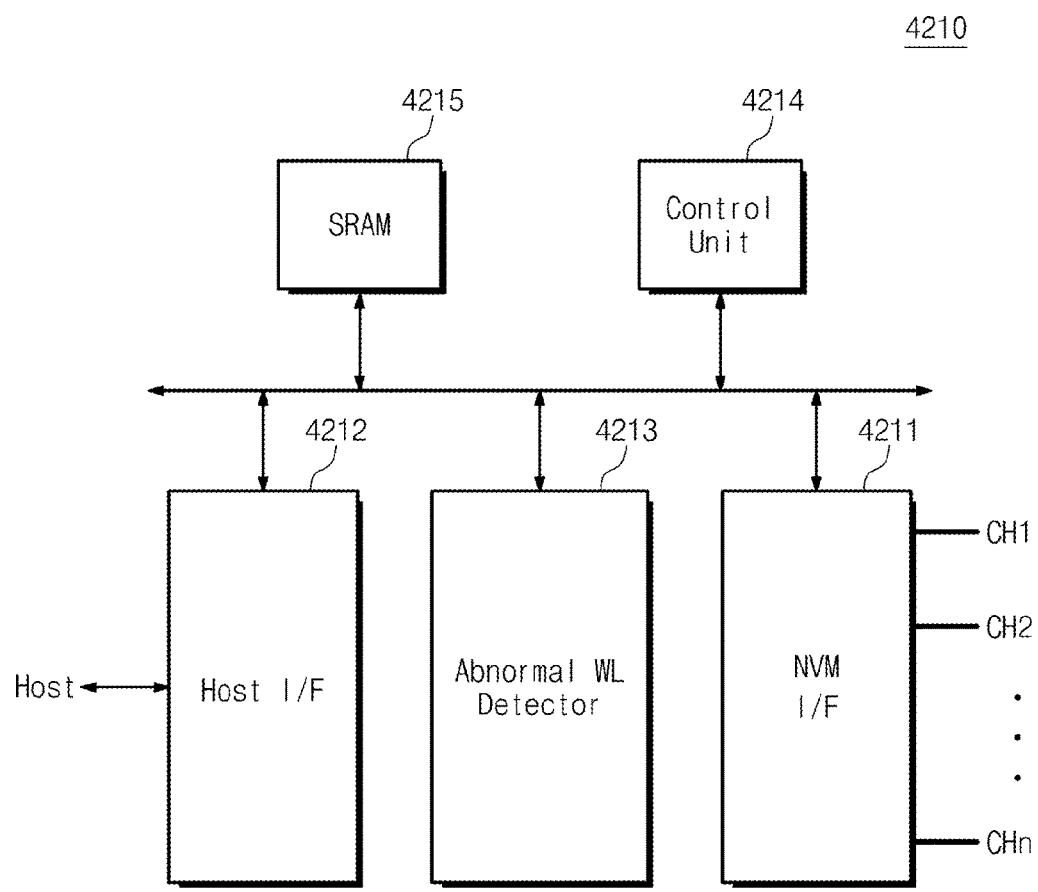
FIG. 14 is a block diagram further illustrating the SSD controller of FIG. 13.

FIG. 14 is a block diagram further illustrating the SSD controller of FIG. 13. Referring to FIG. 14, an SSD controller 4210 may include an NVM interface 4211, a host interface 4212, an abnormal wordline detector 4213, a control unit 4214, and an SRAM 4215.

The NVM interface 4211 may scatter data transferred from a main memory of a host 4100 to channels CH1 to CHn, respectively. The NVM interface 4211 may transfer data read from nonvolatile memories 4201 to 420n to the host 4100 via the host interface 4212.

The host interface 4212 may provide an interface with an SSD 4200 according to the protocol of the host 4100. The host interface 4212 may communicate with the host 4100 using USB (Universal Serial Bus), SCSI (Small Computer System Interface), PCI express, ATA, PATA (Parallel ATA), SATA (Serial ATA), SAS (Serial Attached SCSI), or the like. The host interface 4212 may also perform a disk emulation function which enables the host 4100 to recognize the SSD 4200 as a hard disk drive (HDD).

The abnormal wordline detector 4213 may divide or detect an abnormal wordline or fail bit information or off cell information of each page in the nonvolatile memories 4201 to 420n. The control unit 4214 may analyze and process signals input from the host 4100. The control unit 4214 may control the host 4100 or the nonvolatile memories 4201 to 420n through the host interface 4212 or the NVM interface 4211. The control unit 4214 may control the nonvolatile memories 4201 to 420n according to firmware to drive the SSD 4200.

The SRAM 4215 may be used to drive software which efficiently manages the nonvolatile memories 4201 to 420n. The SRAM 4215 may store metadata input from a main memory of the host 4100 or cache data. At a sudden power-off operation, metadata or cache data stored in the SRAM 4215 may be stored in the nonvolatile memories 4201 to 420n using an auxiliary power supply 4220.

Returning to FIG. 13, an SSD system 4000 may detect an abnormal wordline at an early stage. Further, it is possible to distinguish normal and abnormal wordlines using fail bit change rates or off cell change rates of pages calculated via the abnormal wordline detector.

Figure 15:
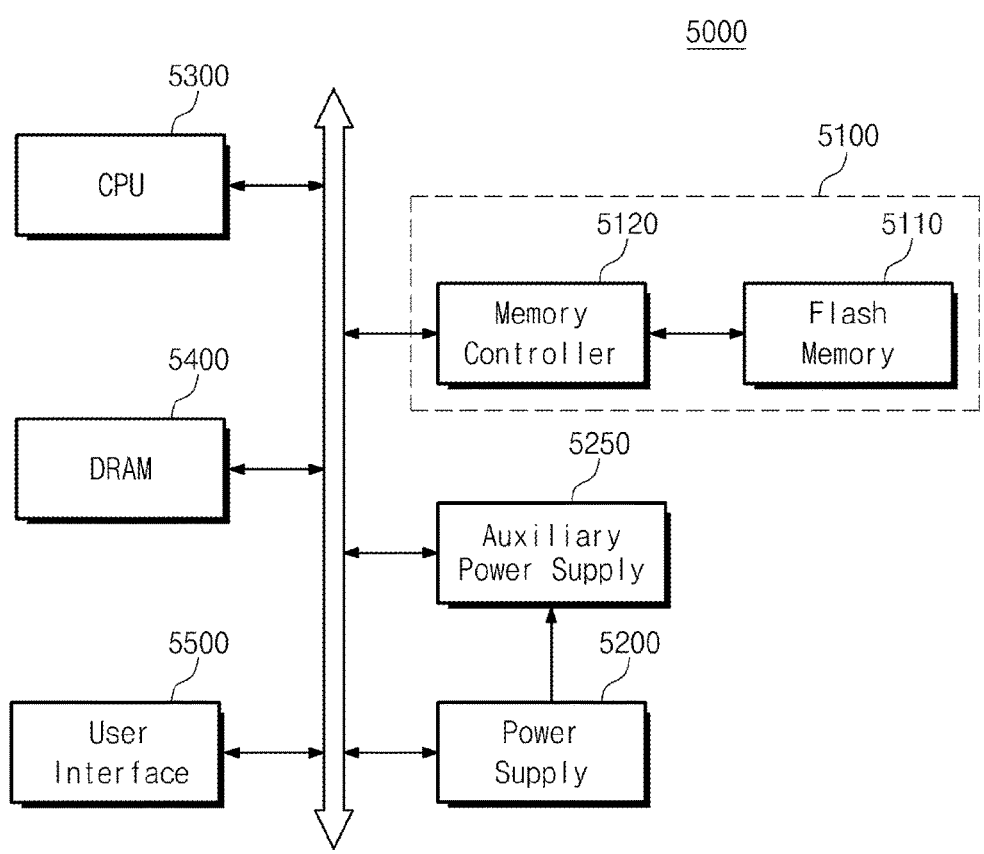
FIG. 15 is a block diagram illustrating an electronic device that may incorporate a flash memory system according to an embodiment of the inventive concept.

FIG. 15 is a block diagram illustrating an electronic device that may incorporate a flash memory system according to an embodiment of the inventive concept. Herein, an electronic device 5000 may be a personal computer or a handheld electronic device such as a notebook computer, a cellular phone, a PDA, a camera, or the like.

Referring to FIG. 15, the electronic device 5000 may include a memory system 5100, a power supply device 5200, an auxiliary power supply 5250, a CPU 5300, a DRAM 5400, and a user interface 5500. The memory system 5100 may include a flash memory 5110 and a memory controller 5120. The memory system 5100 can be built in the electronic device 5000.

The electronic device 5000 may detect an abnormal wordline at an early stage. Further, it is possible to distinguish normal and abnormal wordlines using fail bit change rates or off cell change rates of pages calculated via an abnormal wordline detector.

A memory system according to certain embodiments of the inventive concepts may incorporate a flash memory having a three-dimensional (3D) memory cell array, as well as, or in lieu of, a two-dimensional memory cell array.

Figure 16:
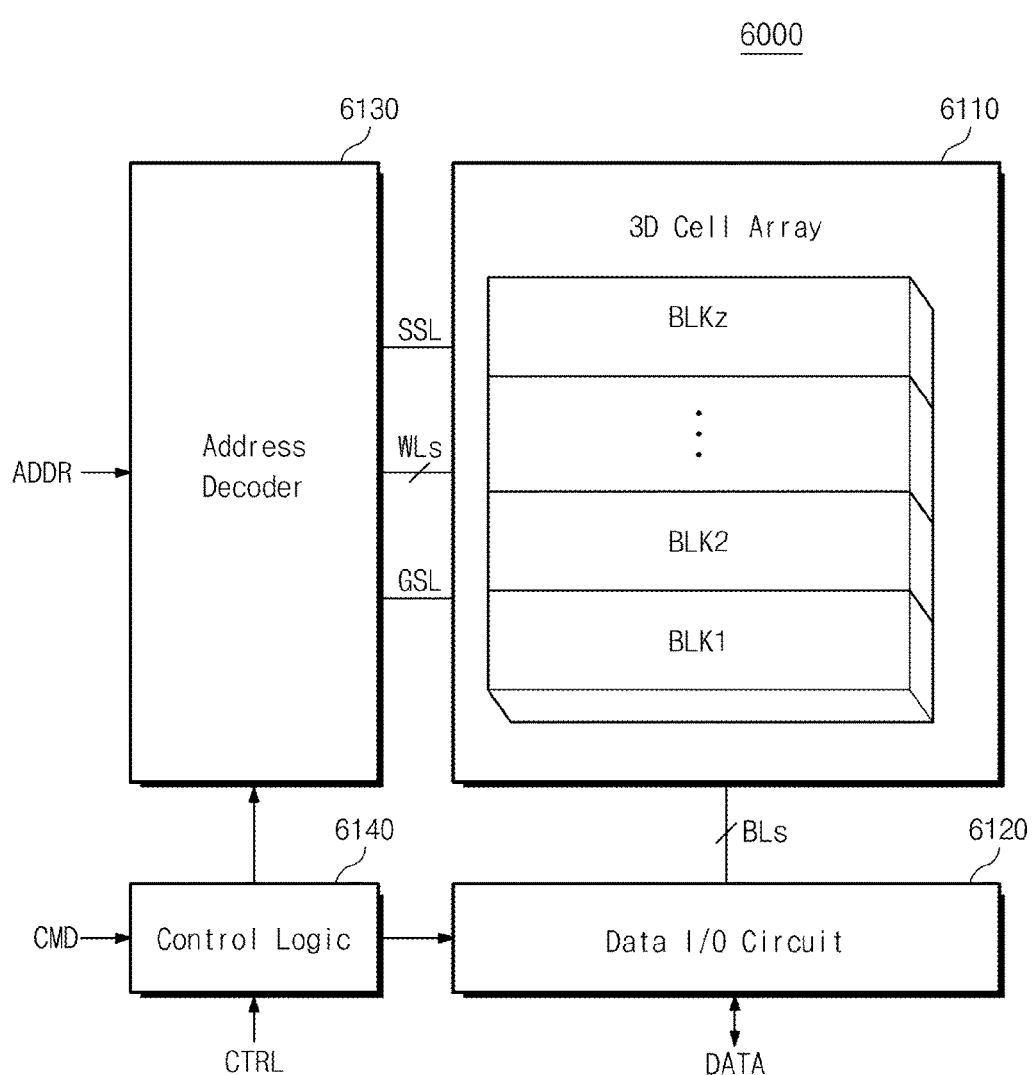
FIG. 16 is a block diagram illustrating one type of flash memory device having a three-dimensional (3D) memory cell array that may be incorporated to an embodiment of the inventive concept.

FIG. 16 is a block diagram illustrating a flash memory having a 3D memory cell array applied to an embodiment of the inventive concept. Referring to FIG. 16, a flash memory 6000 may include a three-dimensional (3D) cell array 6110, a data input/output circuit 6120, an address decoder 6130, and control logic 6140.

The 3D cell array 6110 may include a plurality of memory blocks BLK1 to BLKz, each of which is formed to have a three-dimensional structure (or, a vertical structure). In a memory block having a two-dimensional (horizontal) structure, memory cells may be formed in a direction parallel with a substrate. In a memory block having a three-dimensional structure, memory cells may be formed in a direction perpendicular to the substrate. Each of the memory blocks BLK1 to BLKz may be an erase unit of the flash memory 6000.

The data input/output circuit 6120 may be connected with the 3D cell array 6110 via a plurality of bit lines. The data input/output circuit 6120 may receive data from an external device or output data read from the 3D cell array 6110 to the external device. The address decoder 6130 may be connected with the 3D cell array 6110 via a plurality of wordlines and selection lines GSL and SSL. The address decoder 6130 may select the wordlines in response to an address (ADDR).

The control logic 6140 may control programming, erasing, reading, etc. of the flash memory 6000. For example, at programming, the control logic 6140 may control the address decoder 6130 and the data input/output circuit 6120 such that a program voltage is supplied to a selected wordline and data is programmed.

Figure 17:
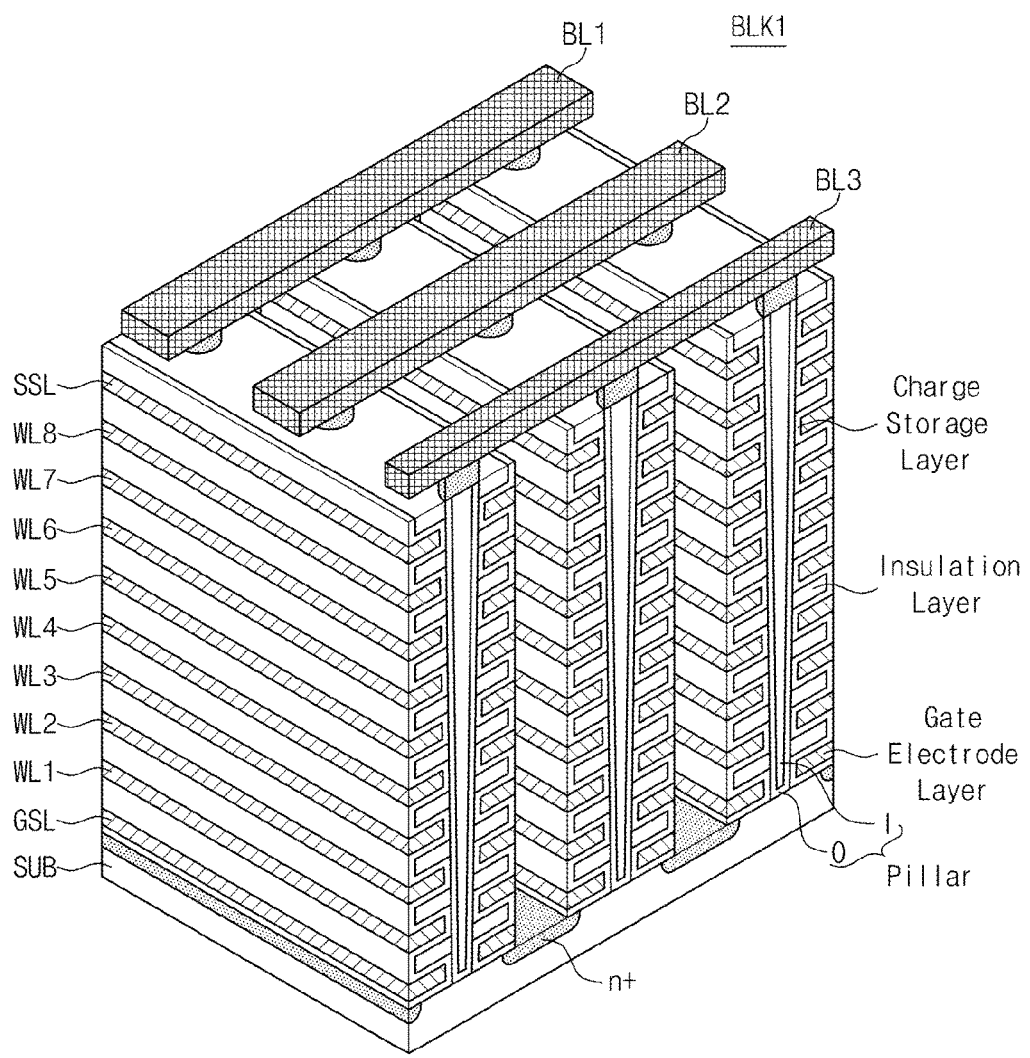
FIG. 17 is a perspective view further illustrating the 3D memory cell array in the context of a single memory block shown in FIG. 16.

FIG. 17 is a perspective view further illustrating the 3D structure of a memory block illustrated in FIG. 16. Referring to FIG. 17, a memory block BLK1 may be formed in a direction perpendicular to a substrate SUB. An n+ doping region may be formed at the substrate SUB. A gate electrode layer and an insulation layer may be deposited on the substrate SUB in turn. A charge storage layer may be formed between the gate electrode layer and the insulation layer.

If the gate electrode layer and the insulation layer are patterned in a vertical direction, a V-shaped pillar may be formed. The pillar may be connected with the substrate SUB via the gate electrode layer and the insulation layer. An outer portion O of the pillar may be formed of a channel semiconductor, and an inner portion I thereof may be formed of an insulation material such as silicon oxide.

The gate electrode layer of the memory block BLK1 may be connected with a ground selection line GSL, a plurality of wordlines WL1 to WL8, and a string selection line SSL. The pillars of the memory block BLK1 may be connected with a plurality of bit lines BL1 to BL3. In FIG. 17, there is illustrated the case that one memory block BLK1 has two selection lines SSL and GSL, eight wordlines WL1 to WL8, and three bit lines BL1 to BL3. However, the inventive concept is not limited thereto.

Figure 18:
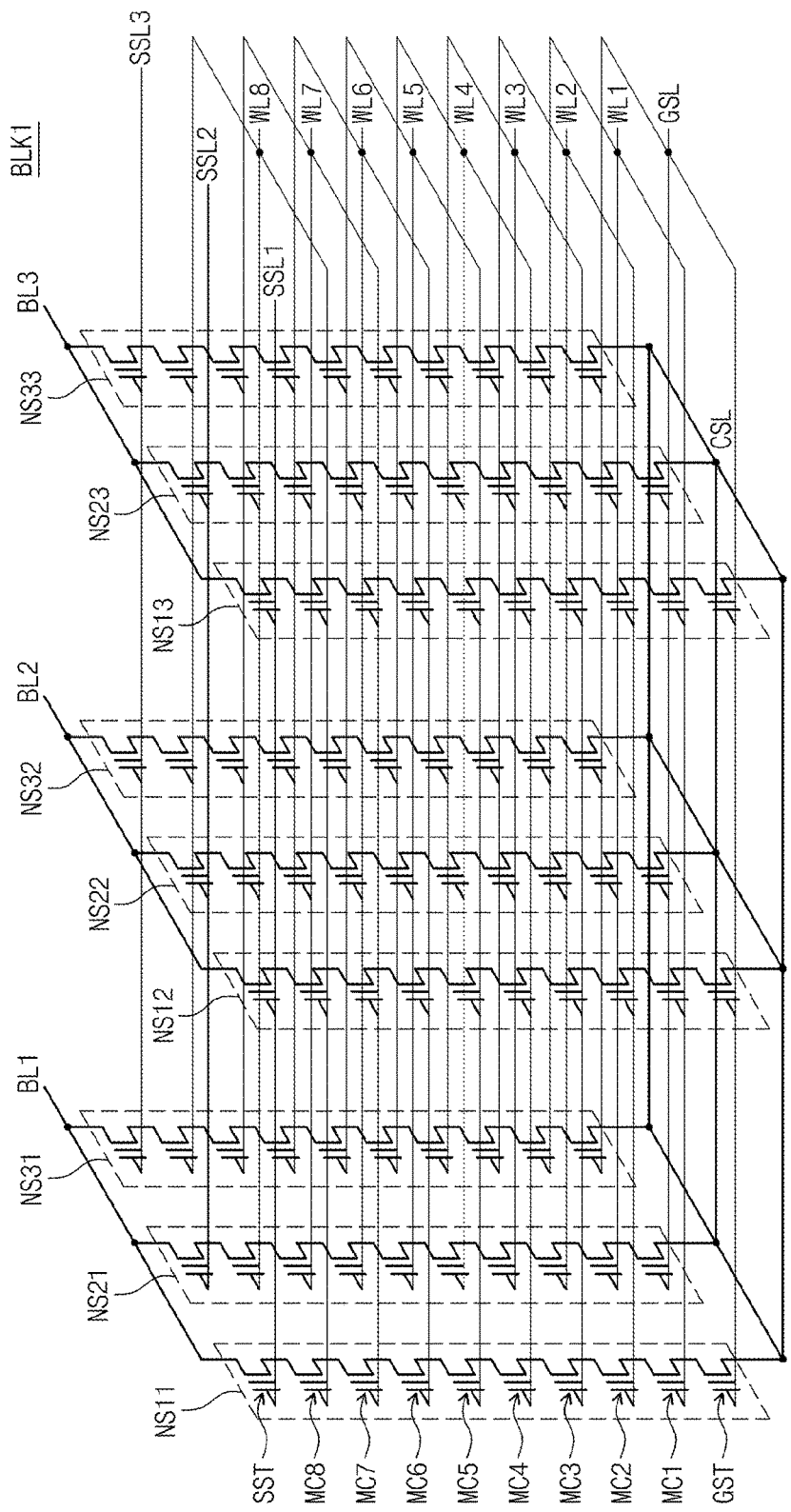
FIG. 18 is a partial equivalent circuit for the memory block of FIG. 17.

FIG. 18 is an equivalent circuit for the memory block illustrated in FIG. 17. Referring to FIG. 18, NAND strings NS11 to NS33 may be connected between bit lines BL1 to BL3 and a common source line CSL. Each NAND string (e.g., NS11) may include a string selection transistor SST, a plurality of memory cells MC1 to MC8, and a ground selection transistor GST.

The string selection transistors SST may be connected with string selection lines SSL1 to SSL3. The memory cells MC1 to MC8 may be connected with corresponding wordlines WL1 to WL8, respectively. The ground selection transistors GST may be connected with ground selection line GSL. A string selection transistor SST may be connected with a bit line and a ground selection transistor GST may be connected with a common source line CSL.

Wordlines (e.g., WL1) having the same height may be connected in common, and the string selection lines SSL1 to SSL3 may be separated from one another. At programming of memory cells (constituting a page) connected with a first wordline WL1 and included in NAND strings NS11, NS12, and NS13, there may be selected a first wordline WL1 and a first string selection line SSL1

The flash memory 6000 having a three-dimensional structure may detect an abnormal wordline at an early stage. Further, it is possible to distinguish normal and abnormal wordlines using fail bit change rates or off cell change rates of pages calculated via an abnormal wordline detector.

While the inventive concept has been described with reference to exemplary embodiments, it will be apparent to those skilled in the art that various changes and modifications may be made without departing from the scope of the present inventive concept as defined by the following claims. Therefore, it should be understood that the above embodiments are not limiting, but illustrative.

What is claimed is:

1. A flash memory system comprising:
a flash memory having a memory cell array and a memory controller configured to control operation of the flash memory, wherein the memory controller comprises:
an ECC circuit that receives first page data and second page data read from the flash memory and respectively counts a first number of fail bits in the first page data and a second number of fail bits in the second page data, wherein the first page data is read from first flash memory cells connected to a first wordline and the second page data is read from second flash memory cells connected to a second wordline different from the first wordline;
an abnormal wordline detector configured to:
derive a fail bit change rate between the first number of fail bits in the first page data and the second number of fail bits in the second page data,
compare whether the derived fail bit change rate exceeds a reference fail bit change rate to generate a comparison result, and
generate an abnormal wordline detection signal based on the comparison result; and
a control unit that performs a restoration operation on memory cells of the first wordline in response to determining that the abnormal wordline detection signal indicates the derived fail bit change rate exceeds the reference fail bit change rate.

2. The flash memory system of claim 1, wherein the abnormal wordline detector operates in response to an enable signal provided by the control unit.

3. The flash memory system of claim 1, wherein the first and second wordlines are physically adjacent to one another in the memory cell array.

4. The flash memory system of claim 1, wherein the abnormal wordline detector is further configured to store the first number of fail bits and the second number of fail bits.

5. The flash memory system of claim 1, wherein memory cell array has a three dimensional structure.

6. A flash memory system comprising:
a flash memory comprising:
a memory cell array; and
an off cell counter that counts a first number of off cells in first page data read from the flash memory by a read operation using a read voltage and counts a second number of off cells in second page data read from the flash memory by the read operation, wherein the first page data is read from first flash memory cells connected to a first wordline and the second page data is read from second flash memory cells connected to a second wordline different from the first wordline; and
a memory controller configured to control operation of the flash memory, wherein the memory controller comprises:
an abnormal wordline detector configured to:

derive an off cell change rate between the first number of off cells in the first page data and the second number of off cells in the second page data, compare whether the derived off cell change rate exceeds a reference off cell change rate to generate a comparison result, and generate an abnormal wordline detection signal based on the comparison result; and a control unit that performs a restoration operation on memory cells of the first wordline in response to determining that the abnormal wordline detection signal indicates the derived off cell change rate exceeds the reference off cell change rate.

7. The flash memory system of claim 6, wherein the abnormal wordline detector operates in response to an enable signal provided by the control unit.

8. The flash memory system of claim 6, wherein the first and second wordlines are physically adjacent to one another in the memory cell array.

9. The flash memory system of claim 6, wherein the abnormal wordline detector is further configured to store the first number of off cells and the second number of off cells.

10. The flash memory system of claim 6, wherein memory cell array has a three dimensional structure.

11. A method of operating a flash memory system including a flash memory having a memory cell array and a memory controller configured to control operation of the flash memory, the method comprising:

using an ECC circuit in the memory controller to receive first page data and second page data read from the flash memory and respectively count a first number of fail bits in the first page data and a second number of fail bits in the second page data, wherein the first page data is read from first flash memory cells connected to a first wordline and the second page data is read from second flash memory cells connected to a second wordline different from the first wordline; and using an abnormal wordline detector in the memory controller, separate from the ECC circuit, to derive a fail bit change rate between the first number of fail bits in the first page data and the second number of fail bits in the second page data, compare whether the derived fail bit change rate exceeds a reference fail bit change rate to generate a comparison result, and generate an abnormal wordline detection signal based on the comparison result, wherein a control unit in the memory controller performs a restoration operation on memory cells of the first wordline in response to determining that the abnormal wordline detection signal indicates the derived fail bit change rate exceeds the reference fail bit change rate.

12. The method of claim 11, wherein the first and second wordlines are physically adjacent to one another in the memory cell array.

13. The method of claim 11, further comprising storing the first number of fail bits and the second number of fail bits.

14. The method of claim 11, wherein memory cell array has a three dimensional structure.

* * * * *